Dec. 21, 1937.  G. J. BLUM  2,102,782
HACKSAW
Filed Feb. 2, 1934
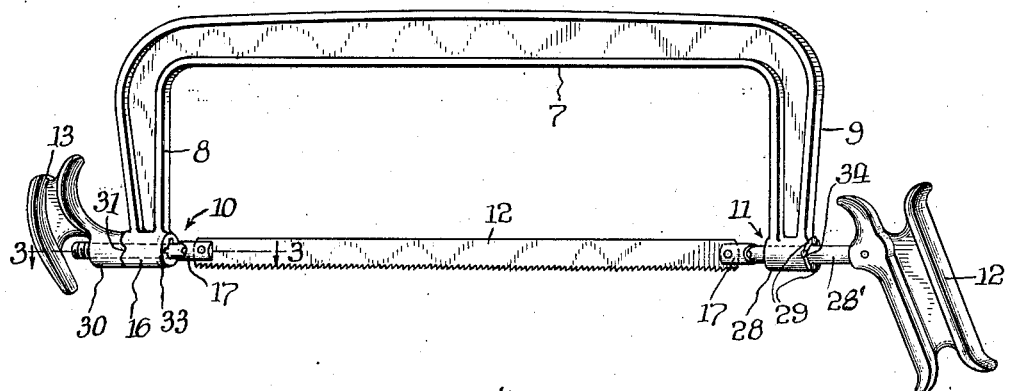
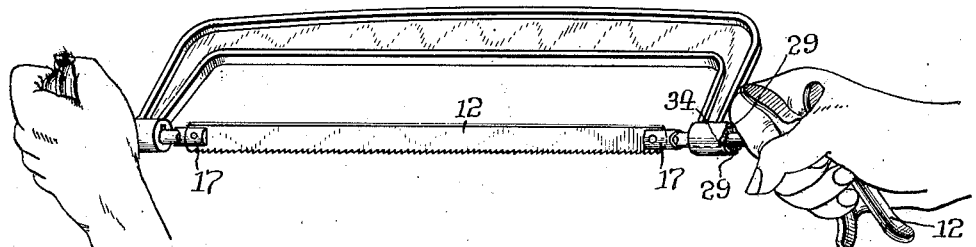
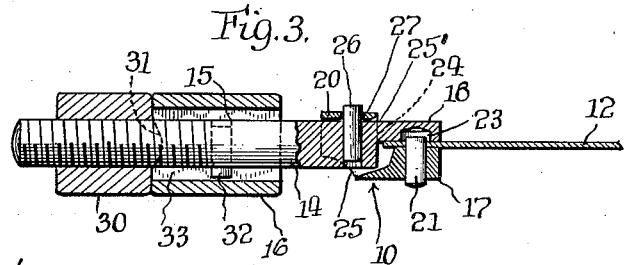
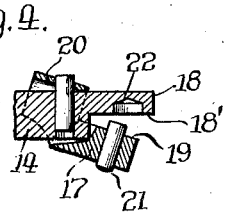 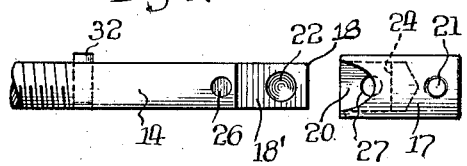
Inventor:
George J. Blum,
By Clindahl Parker Carlson
Attys.

Patented Dec. 21, 1937

2,102,782

UNITED STATES PATENT OFFICE 2,102,782

HACKSAW

George J. Blum, Chicago, Ill., assignor to Armstrong-Blum Mfg. Co., Chicago, Ill., a corporation of Illinois Application February 2, 1934, Serial No. 709,417

6 Claims. (Cl. 145—35)

The invention pertains to hack saws, and in certain of its aspects relates particularly to hand saws.

One object of the invention is to provide an improved blade holder for hack saws, such that the ends of the blade may be held rigidly against torsional strains.

Another object is to provide a blade holder for hack saws which is capable of clamping the ends of the blade rigidly in position, and which is susceptible of convenient operation in inserting and removing blades.

Still another object is to provide an improved form of blade clamping mechanism adapted to utilize the tension in the blade for moving the mechanism into tight clamping engagement with the associated end portion of the saw blade.

A further object is to provide a hand hack saw having blade holders mounted in the ends of a U-shaped frame and handles associated with the opposite blade holder arranged to permit of a more direct application of the reciprocating force to the blade.

The objects of the invention thus generally stated together with other and ancillary advantages are obtained in the accompanying drawing forming a part hereof wherein:—

Figure 1 is a side elevational view of a hack saw embodying my invention.

Fig. 2 is a similar view illustrating the blade in a different relation, but showing the frame inclined with respect to the line of cut.

Fig. 3 is the longitudinal sectional view on an enlarged scale taken approximately in the plane of line 3—3 of Fig. 1, and illustrating the details of construction of my improved blade holders.

Fig. 4 is a fragmentary sectional view showing the blade clamp of the holder with its movable clamping jaw in open position.

Fig. 5 is an exploded view of the blade-holding clamp with the parts in position for assembly.

In the embodiment of my invention selected for purposes of illustration, 7 designates a rigid U-shaped frame preferably of cast metal having front and rear arms 8 and 9 in the free ends of which are mounted blade holders generally designated 10 and 11, in which the opposite ends of a hack saw blade 12 are clamped. Associated with the respective blade holders 10 and 11 are rear and forward handles 12 and 13.

The present invention contemplates tensioning means for the blade and an improved arrangement for one or both of the blade holders including a stem member positively connected with the respective arms 8 or 9 and having a fixedly secured blade anchoring element to hold the blade against longitudinal movement relative to the stem member while the blade is under tension. Moreover, the invention provides clamping means on the holder operative as an incident to an increase in tension on the blade to grip the blade with increasing pressure.

As shown in Fig. 3, the blade holder 10 comprises a stem 14 herein shown as cylindrical in form and slidable through a hole 15 in a headed end portion 16 of the frame 8. At the inner end of this stem is a blade clamp having a fixed jaw 18 and a movable jaw 17.

As herein shown, the two jaws 17 and 18 are substantially semi-circular in cross section and respectively provide flat clamping surfaces 18' and 19. In mounting the movable jaw for movement relative to the fixed jaw a pivotal connection is employed, and for this purpose, the movable jaw has formed integral therewith an annulus 20 loosely encircling the stem 14. The jaw proper is offset to one side of the axis of the annulus for cooperation with the stationary jaw 18, which is similarly offset to one side of the stem 14, but in a direction opposite the movable jaw 17. In the movable jaw is mounted a blade-anchoring element in the form of a pin 21 projecting from the clamping face 19 and adapted to enter a recess 22 in the stationary jaw in the clamped relation of the parts. Over this pin as shown in Fig. 3, the end of the blade is inserted, the latter being provided with the usual hole 23 for this purpose.

In making the blade clamps, I employ a construction permitting of very economical manufacture. Thus, the stationary jaw 18 is formed integral with the stem 14 by milling the inner end of the stem transversely to a depth slightly beyond the axis of the stem, thus making this jaw substantially semi-circular in cross section.

The movable jaw 17 and its supporting annulus 20 are similarly formed from round metal stock. In this operation, a short piece of such stock is bored axially thereof at one end to form the annulus 20, and the other end is milled transversely so as to form the jaw 17. The width of the cut is such as to intersect at one end the inner end of the bore made in forming the annulus. Thus, a segmental opening 24 is formed at the inner end of the annulus and at one side of the jaw 17 for receiving the fixed jaw 18. The annulus is made of a diameter such as to fit loosely over the stem 14, and to permit of a pivotal movement of the jaw 17, the annulus is counterbored at an angle to its axis so as to cut away the portion of the annulus on the side carrying the jaw 17, as indicated at 25, and also to remove a portion of metal at the opposite side of the annulus, as indicated at 25'.

In mounting the movable jaw pivotally on the stem 14, I employ a hardened radial pin 26 pressed into the stem and projecting a short distance beyond the surface on the side of the stationary jaw 16. This pin is entered through a hole 27 in the corresponding side of the annulus, the hole being of such size and shape as to permit of the rocking of the annulus relative to the stem and thereby of a limited pivotal movement of the jaw 17 relative to the jaw 18.

It will be observed that the pivot point of the movable jaw is offset laterally from the point of connection with the blade. Accordingly, with the latter hooked over its pin, an endwise force exerted on the stem in a direction away from the blade will cause the movable jaw to swing toward the stationary jaw, and the greater such endwise force, the greater will be the ensuing clamping action, it being assumed, of course, that the blade is held stationary at its opposite end.

The clamp 11 for the rear end of the blade is of the same construction as the clamp 10 and need not, therefore, be described in detail. In this instance, the fixed jaw is formed integral with a stem 28' extending slidably through a head 28 at the lower end of the frame arm 9, and carried by the stem is a radially projecting pin 29 adapted to bear at oppositely projecting ends against the rear face of the head 28. Rearwardly of the pin 29 the rear handle 12 is secured to the stem 28'. As herein shown, this handle is in the form of a casting projecting downwardly and rearwardly from the stem and shaped to be gripped conveniently by the hand of the operator.

The forward handle 13 is also in the form of a casting and is mounted on the forward end of the stem 14 so as to project upwardly therefrom in spaced relation to the front frame arm 8. This handle has as an integral part thereof a nut 30 in screw threaded engagement with the stem 14 and adapted to bear against the forward face of the head 16 of the arm 8 to draw the same forwardly and thereby tighten the blade in the clamps 10 and 11. For the purpose of holding the parts in adjusted relation, the nut 30 and head 16 are corrugated to provide coacting cam faces, as indicated at 31 (Fig. 1). Thus, when the blade is placed under tension a yieldable frictional resistance is interposed sufficient to hold the nut against rotation.

In order that the blade may be secured in any one of a plurality of positions angularly relative to the frame, each of the stems 14 and 27 is adapted to be secured in different angular positions in their respective heads 16 and 28. Thus, the stem 14 is provided with a radial pin 32 (Fig. 3) engageable with one of a plurality of longitudinal grooves 33 cut in the wall of the bore 15 through the head. Herein, the grooves are employed spaced circumferentially 90 degrees apart. Similarly, at the rear end of the saw, the opposite ends of the pin 29 on the stem 28' are adapted to engage in radial grooves 34 cut in the rear face of the head 28, four such grooves, spaced 90 degrees apart, being preferably employed.

From a comparison of Figs. 1 and 2, it will be apparent that by the construction set forth, the blade 12 may be clamped in any one of three different angular positions relative to the frame. Thus, the blade may be clamped in either of two angular positions spaced 90° from that shown in Fig. 1, so that when the blade is disposed in a vertical plane, the frame may be tilted to one side or the other as shown in Fig. 2.

It will be seen that I have provided a hack saw of a very practical character, having clamps of simple construction capable of holding the blade effectively against torsional strains and thereby eliminating all danger of disengagement of the blade from its anchoring means, as well as substantially reducing the possibility of breakage of the blade. Moreover, by the provision of front and rear handles mounted directly on the blade holding stems, the reciprocating force may be applied to the saw blade directly along the line of the cut being made. Finally, the construction of the blade clamps is such as to permit of easy attachment and removal of the blade.

I claim as my invention:

1. A blade holder for hack saws comprising an endwise movable member, a fixed jaw rigid with said member, a movable jaw, one of said jaws having a disengageable connection with the end of a saw blade, a pivotal connection between said jaws in laterally offset relation to said connection with the blade and on the side of said member away from the clamping face of said fixed jaw, said movable jaw being adapted to rock in the direction of the fixed jaw as an incident to an increase in tension on the table.

2. A blade holder for hack saws, comprising a stem having a fixed clamping jaw rigid therewith with a flat clamping face disposed substantially on the longitudinal center line of the stem, a movable clamping jaw in opposed relation to the fixed jaw, a blade-anchoring element carried by said movable jaw, and a supporting member for the movable jaw pivoted on the stem on the opposite side of said center line from the movable jaw.

3. A blade holder for hack saws, comprising a stem having a fixed clamping jaw rigid therewith with a flat clamping face disposed substantially on the longitudinal center line of the stem, a movable clamping jaw in opposed relation to the fixed jaw, a blade-anchoring element carried by said movable jaw, and an annulus loosely encircling said stem and carrying said movable jaw, said annulus having a pivotal connection with the stem on the side thereof opposite the movable jaw.

4. A blade holder for hack saws, comprising a cylindrical stem having one end portion cut to form a fixed clamping jaw on one side thereof with a flat clamping face disposed in substantial alinement with the axis of the stem, an annulus loosely encircling the stem, a pivot pin carried by the stem on the side carrying the fixed jaw, said annulus having an aperture loosely receiving said pin and being adapted to rock relative to the stem, a movable clamping jaw rigid with said annulus and having a flat clamping face movable in the rocking movement of the annulus toward and from the clamping face of the fixed jaw, and an anchoring stud on said movable jaw adapted to receive the apertured end of a saw blade.

5. A hack saw comprising a frame having front and rear arms, anchoring means for one end of the blade carried by one of said arms, a clamp on the other arm having opposed jaws and an anchoring element for the blade, and means for placing the blade under tension, one of said jaws being swingable to carry the same toward and away from the other jaw at one side of the blade and having a pivotal support on the other side of the blade operative as an incident to an increase in the tension on the blade to cause said jaws to grip the same with increasing pressure to prevent sidewise movement thereof, said anchoring element serving positively to maintain the blade against longitudinal movement relative to the clamp.

6. A blade holder for hack saws comprising, in combination, an elongated member adapted to be mounted in a saw frame, a fixed clamping jaw rigid with one end of said member and disposed at one side of the axis thereof, a movable clamping jaw adapted for coaction with the fixed jaw for the reception therebetween of a saw blade, a support for the movable jaw extending transversely of said member and having a pivotal connection therewith at the side thereof carrying said fixed jaw and on the opposite side of the fixed jaw from the movable jaw, and an anchoring element cooperating with said jaws to hold the blade against movement relative thereto.

GEORGE J. BLUM.